United States Patent [19]

La Rocca

[11] Patent Number: 5,981,901
[45] Date of Patent: Nov. 9, 1999

[54] METHOD AND DEVICE FOR GAS SHIELDING LASER PROCESSED WORK PIECES

[76] Inventor: Aldo Vittorio La Rocca, 10020 Moncalieri (Italy) Viale dei Castagni, 4 - Frazione Revigliasco, Italy

[21] Appl. No.: 08/852,928

[22] Filed: May 8, 1997

Related U.S. Application Data

[63] Continuation of application No. 08/251,712, May 31, 1994, abandoned, which is a continuation of application No. PCT/IT92/00151, Nov. 27, 1992.

[30] Foreign Application Priority Data

Nov. 29, 1991 [IT] Italy .................................. TO91A9333

[51] Int. Cl.⁶ .................................................. B23K 26/14
[52] U.S. Cl. .............................. 219/121.63; 219/121.64; 219/121.84
[58] Field of Search ........................... 219/121.6, 121.63, 219/121.64, 121.84, 121.85

[56] References Cited

U.S. PATENT DOCUMENTS

| | | | |
|---|---|---|---|
| 4,000,392 | 12/1976 | Banas et al. | |
| 4,078,167 | 3/1978 | Banas et al. | 219/121.84 |
| 4,128,753 | 12/1978 | Sharp | 219/121.84 |
| 4,642,445 | 2/1987 | Stol | 219/121.84 |
| 4,723,063 | 2/1988 | Armier et al. | 219/121.63 |
| 4,801,352 | 1/1989 | Piwczyk | 219/121.84 |
| 4,990,741 | 2/1991 | Moores et al. | 219/121.64 |
| 5,359,176 | 10/1994 | Balliet, Jr. et al. | 219/121.84 |

FOREIGN PATENT DOCUMENTS

| | | | |
|---|---|---|---|
| 2165916 | 8/1973 | France . | |
| 2360376 | 3/1978 | France . | |
| 258386 | 7/1988 | Germany | 219/121.84 |
| 57-56190 | 4/1982 | Japan | 219/121.85 |
| 61-283484 | 12/1986 | Japan | 219/121.84 |
| 5131288 | 5/1993 | Japan | 219/121.63 |
| 2045141 | 10/1980 | United Kingdom . | |

*Primary Examiner*—Gregory Mills
*Attorney, Agent, or Firm*—Michael N. Meller; Eugene Lieberstein

[57] ABSTRACT

On an apparatus (10) for laser processing workpieces (18), and whereby a laser beam (11) is directed on to a portion (13) of a substantially perpendicular work surface (14), a jet (21) of shielding gas is fed over the work surface portion (13) crosswise in relation to the laser beam (11) and at such high speed as to substantially prevent any alteration of the physical and/or chemical properties of the gas. The jet (21) is supplied along a solid-walled conduit (26) comprising two transverse openings (29, 31) for the passage of the beam (11) on to the work surface portion (13); and a nozzle (32) for producing a gas jet (21) of appropriate speed.

20 Claims, 4 Drawing Sheets

METHOD AND DEVICE FOR GAS SHIELDING LASER PROCESSED WORK PIECES

This application is a continuation, of application Ser. No. 08/251,712, filed May 31, 1994 now abandoned is a Continuation-in-Part of International Patent Application No. PCT/IT92/00151 filed Nov. 27, 1992.

TECHNICAL FIELD

The present invention relates to a method and device for gas shielding laser processed workpieces, e.g., laser welded metal parts.

BACKGROUND ART

Some laser processes, such as welding, require an inert gas atmosphere, such as helium, argon, etc., about the area subjected to the laser beam, to prevent a chemical reaction of the material caused by the combined action of heat and atmospheric gases, of which oxygen is the most reactive.

In certain cases in which the material is not negatively affected by nitriding, dry nitrogen may also be used successfully.

On known devices for feeding such gas over the workpieces, the laser beam is directed and focused inside a conical nozzle together with a jet of inert shielding gas, usually with no separation of the two, and the inert gas is directed freely on to the work area.

Devices of the aforementioned type present numerous drawbacks. One of these is that the gas remains contacting a frequently excessive portion of the laser beam over what is usually an excessive length of time. In this respect, it is important to bear in mind that a gaseous mixture is heated by a laser beam in proportion to its capacity to absorb radiation at the laser beam wave length; in proportion to the length of time it is subjected to such radiation; and in inverse proportion to its heat capacity. The first undesired effect of such heating is that it results in an irregular alteration of the refraction coefficient of the gas, thus distorting and impairing the focus of the laser beam, which is further impaired by the convective motion produced in the heated mixture.

Should heating persist long enough for the gas to reach first the thermal excitation and then the thermal ionization threshold, this results in highly dissipative phenomena, which absorb the energy of the laser beam. In extreme cases of almost total or predominant ionization, the energy of the beam may be almost totally absorbed by the gas, thus giving rise to what is known as "blanketing", whereby the laser beam is practically prevented from reaching the workpiece.

The shielding gas must therefore present a definite number of properties:

1) low radiation absorption coefficient at the laser beam wave length;
2) high heat capacity;
3) high thermal ionization threshold or ionization potential;
4) minimum interaction or transit time (the length of time it is subjected to the laser beam);
5) for shielding against thermochemical reactions, the gas must be immune to such reactions. For this, noble gases are preferred, especially helium (He), the ionization potential and heat capacity of which are among the highest, and which also presents a low absorption coefficient of the most commonly used industrial laser beams.

In view of the above considerations, the most logical choice is helium, providing it is economically feasible, especially in Europe.

Another possibility is argon. In addition, however, to a higher radiation absorption coefficient at the wave lengths commonly used in industry, this also presents a low heat capacity and ionization potential as compared with helium. These drawbacks, however, may be overcome by proportionally reducing the interaction time, and by appropriate streamlining of the shielding gas jet.

Moreover, as ionization is predominantly thermal and, as such, governed by Saha's law, steps may also be taken to increase the pressure and reduce the temperature of the gas jet in the laser beam crossover region.

One of the major objectives involved, therefore, is that of achieving a uniform gas jet, the properties of which remain unchanged throughout its crossing of the laser beam, i.e. uniform refraction and parallel motion, no convective motion or excitation, and no ionization.

Moreover, the jet must present a poor thermophotochemical reaction with the shielded material. (Hence, no water, oxygen, hydrocarbons, acids, salts, alkalis, etc.).

The impact of the shielding gas, in the form of plasma, on the surface of the workpiece has been found to cause a considerable thermal alteration of the surface, accompanied by vapourization of a layer of material on either side of the weld bead. In particular, in cases where the gas jet is used firstly for cooling a lens, and is then directed, together with and penetrating the length of the laser beam, into a conical nozzle, the issuing jet is substantially ionized. What is more, being directed perpendicularly to the surface of the workpiece, upon impact, the jet not only reaches the high temperatures and pressures corresponding to impact velocity 0 (zero), but is also forced to restore the ionization energy by recombining it.

By combining these effects (high Po, high To) plus the enthalpic values corresponding to restoration of the ionization energy, i.e.

$Po+\Delta P \gg Po$ and $To+\Delta T \gg To$ it follows that the material of the workpiece vapourizes, not beneath the laser beam, but at the edge where it is struck by the plasma jet.

Another point to note is that the high reflectivity of a metal surface at low temperature (practically until it becomes red hot) almost doubles the intensity of the laser beam on impact, thus resulting in ionization despite the low value of the incident laser beam.

This is further assisted by gas, free radicals and other adsorbed chemically active substances, which emit nonthermionic free electrons resulting in avalanching, and, if serious enough, even in blanketing, i.e. an unpredictable (catastrophic) increase in ionization at incident laser beam level, which prevents transmission of the beam on to the workpiece.

Ionization is always accentuated by, and very often in fact due to, the surface of the workpiece, which is inevitably reflective at low temperature, and therefore reflects part of the energy of the laser beam back towards the inert gas atmosphere, thus roughly doubling the intensity of the radiant energy field in the area close to the work surface.

If, on the other hand, the inert gas jet is directed on to the work surface together with the laser beam, it presents a high degree of ionization on impact with the workpiece, and, on bouncing back off the work surface, tends to mix with the atmosphere, thus reducing shielding efficiency. Moreover, ionization energy is taken from the laser beam, which therefore presents a lower power density for a given focal spot; and the variable density of the mixture so formed results in refraction and convection phenomena impairing the focus of the laser beam, thus further reducing its intensity and efficiency.

According to the known state of the art, the jet is supplied freely, often even using conical nozzles. Consequently, when supply pressure increases over and above a critical ratio value (corresponding to sonic velocity at the cone outlet, and characterised by an (outlet pressure)/(stagnation pressure) value of <0.528 for biatomic gases such as air, nitrogen, oxygen, carbon monoxide, etc.), the jet, for lack of a stable law of motion, oscillates violently in direction (wobble) and axial velocity (pulsation). These effects amplify those caused by air mix and drag, and by possible laminar or turbulent boundary layers established inside the nozzle and affecting uniform outflow. In view of the size and distance of commonly used nozzles from the work surface, this combined alteration in outflow, due to the internal and, even more so, external aerodynamic factors involved (boundary layer, air mix and drag), is even more serious in the event oscillation (wobble, pulsation) is amplified by attempts to increase outflow velocity by increasing supply pressure. In the case of normal size subsonic nozzles, the instability caused by exceeding the critical pressure frequently results in such severe oscillation that the laser beam impact area is substantially uncovered, thus impairing shielding by the gas, which may be replaced by varying mixtures of air and gas. These alternate over the impact point of the laser beam, which is thus swept by a pulsating jet in which the percentage of shielding gas may vary enormously and in a random manner characteristic of this type of non-stationary phenomena.

Reliable control of a freely directed jet requires the use of supersonic nozzles, which, with a given configuration and pressure ratio (obviously, for a given type of gas or mixture), provide for a uniform jet. If the pressure ratio is other than nominal, however, this results in the formation, at the outlet, of what is known as Prandlt diamonds and Mach disks. Freely directed supersonic jets nevertheless provide for a better distribution of the field parameters (velocity, density, pressure, temperature), and, though subject to the above internal and external aerodynamic factors (boundary layers, air mix and drag), these are less marked and controllable.

In this case also, scale effects, expressed in Reynolds, Prandlt, Nusselt numbers, etc., must obviously be taken into account. The capacities, distances and sizes used in laser applications may result in field irregularities (the properties of the jet in terms of its parameters, including the incorporation of outside air) possibly affecting shielding efficiency in the laser beam-work surface impact area. Nevertheless, supersonic nozzles provide for achieving velocities and pressures otherwise unattainable using subsonic nozzles.

The latter, very often, are not only badly designed, but also employed with no regard whatsoever to the basic laws of aerodynamics.

Consequently, when the stagnation pressure of a freely directed jet, particularly a subsonic jet, is increased with a view to increasing crossover speed, ambient gas drag efficiency, and also surface pressure, for improving shielding efficiency, this more often than not results in uncontrollable situations the effects of which are quite the opposite to those expected. The commonest include uncontrolled ionization resulting in "nailheads" (irregular weld bead); vapourization and sublimation of the surface material, which often presents grooves on either side of the weld bead; and an irregular metallurgical structure, which often presents a central zone, and two surrounding zones reasonably attributable to the plasma jets on either side of the laser beam responsible for the central zone. This differs widely from the two surrounding zones, though all three are irregular. Structural and geometric irregularity clearly indicates, among other things:

a) undesired, totally irregular stress;

b) severe distortion;

c) poor process efficiency;

d) poor process repeatability;

e) unsatisfactory correlation with available models.

The above introduction clearly indicates, therefore, the importance of correct utilization of the shielding gas, for improving the process in terms of efficiency, quality and repeatability.

Correct usage will also provide for a better correlation of the data involved, thus enabling a better understanding of the phenomenon and its control parameters, and more straightforward, effective models for predicting, achieving and maintaining the required results.

GB-A-2 045 141 discloses a method and apparatus for the control of shielding gas according to the preamble of claims 1 and 7, respectively, wherein a jet of shielding gas is directed from a nozzle across the worpiece surface and recirculated to the nozzle along a ducting, of which the nozzle defines an output.

The input of the circulation duct is spaced apart with respect to the nozzle, the shielding gas being therefore not guided within solid walls in the area of interaction with the laser beam and not separated from the ambient air. Even if the circulation duct is so well designed as to theoretically remove all the shielding gas erected by the nozzle, severe heating by laser beam in the interaction area, where a free boundary layer between such gas and ambient air exists, causes the flow to become inevitably unsteady, and the shielding gas to be mixed with ambient air, thus producing the drawbacks previously discussed, that is: recirculation and thereby long residence time resulting in heating and ionization of the easily ionizable gas mixture. FR-A-2 360 376 discloses a gas shielding apparatus wherein the shielding gas is fed to a cavity surrounding the welding area through a narrow passage. With this geometrical arrangement, supercritical flow conditions are easily reached; oscillations in flow speed and direction at the outlet of the passage are to be expected, and outflow irregularities are further amplified by laser heating, so that a random gas recirculation at low average speed in the cavity is established, which leads to gas ionization and laser beam defocusing.

It is an object of the present invention to provide a straightforward, reliable gas shielding method and device designed to overcome the aforementioned drawbacks.

DISCLOSURE OF INVENTION

According to the present invention, there is provided a method of gas shielding laser processed workpieces, whereby a laser beam is directed in a substantially perpendicular direction on to a portion of a work surface and a jet of shielding gas is fed on to said surface portion along a conduit defined by solid walls, so as to flow over said surface crosswise in relation to said beam, characterised in that said conduit extends from upstream to downstream from said laser beam and has uninterrupted walls but for a laser beam inlet aperture having the minimum area compatible with the passage of said laser beam and a laser beam outlet aperture facing said surface portion, said conduit having a streamlined shape for causing the gas flow to be stationary, said jet of shielding gas being supplied at such a speed as to eliminate the existing ambient gas, and minimise the physical, dynamic and chemical effects of said laser beam on said gas, which thus acts substantially as an inert gas.

According to the present invention, in an apparatus for laser processing a workpiece whereby a laser beam is directed in a substantially perpendicular direction on to a portion of a work surface of said workpiece, a device for gas shielding said workpiece is provided, which device comprises means for storing a shielding gas and means for supplying said gas from said storage means on to said surface, said supply means comprising at least one conduit defined by solid walls and designed to direct a jet of said gas on to said surface crosswise in relation to said laser beam, characterised in that said conduit extends from upstream to downstream from said laser beam and has uninterrupted walls but for a laser beam inlet aperture having the minimum area compatible with the passage of said laser beam and a laser beam outlet aperture facing said surface portion, said conduit having a streamlined shape for causing the gas flow to be stationary, said jet of shielding gas being supplied at such a speed as to eliminate the existing ambient gas and minimise the physical, dynamic and chemical effects of said laser beam on said gas, which thus acts substantially as an inert gas.

BRIEF DESCRIPTION OF DRAWINGS

A number of preferred, non-limiting embodiments of the present invention will be described by way of example with reference to the accompanying drawings, in which.

BEST MODE FOR CARRYING OUT THE INVENTION

Figure 1:
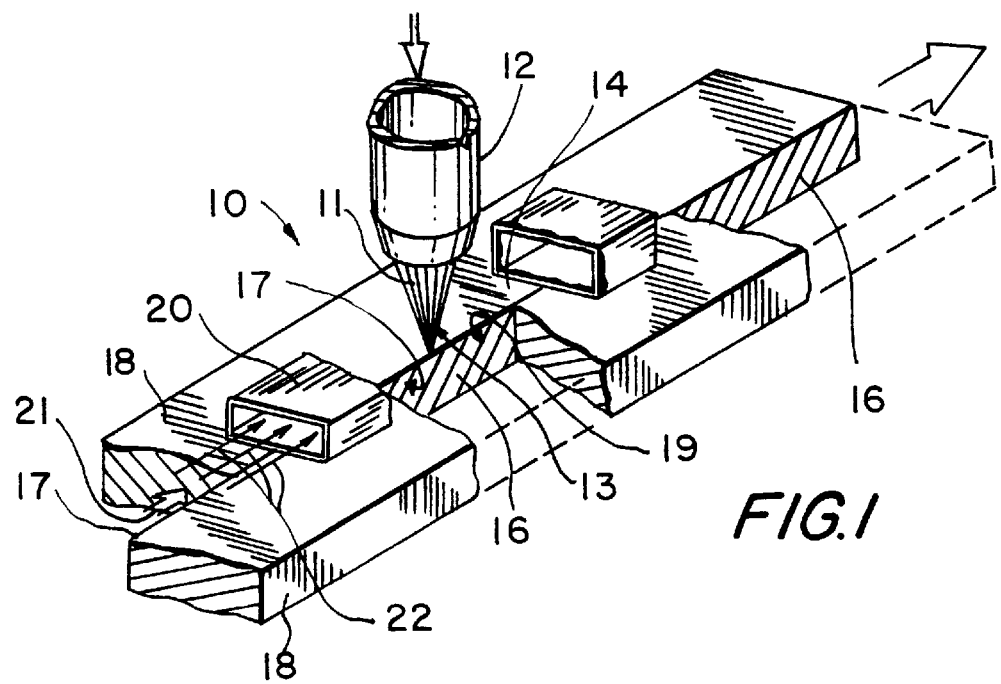
FIG. 1 shows a diagram of the gas shielding method according to the present invention, as applied to a laser process.

Number 10 in FIG. 1 indicates a laser apparatus substantially comprising a source for emitting a laser beam 11 issuing from a laser head 12 and collimated on to a portion 13 of a work surface 14. In particular, apparatus 10 provides for effecting a weld 16 between two facing surfaces 17 of two metal workpieces 18, and producing a weld bead 19 on surface 14.

The method according to the present invention provides for supplying, via a conduit 20 defined by rigid walls, an inert or any appropriate shielding gas over portion 13 of surface 14 subjected to laser beam 11, so as to prevent atmospheric air contacting portion 13 during the welding process. The gas jet 21 is supplied over portion 13 of surface 14 crosswise in relation to the direction of beam 11, and at high, preferably supersonic, speed for substantially preventing the shielding gas from being affected by beam 11.

The conduit 20 is continuous and has a streamlined shape for causing the gas flow to be substantially stationary; the velocity of the flow is predetermined in such a way as to minimise the physical, dynamic and chemical effects of the laser beam 11 on the gas, which thus acts substantially as an inert gas. As a consequence, parameters such as pressure, velocity, refraction index of the gas upstream and downstream the laser beam are substantially the same.

The gas travels and is supplied in the same direction as the workpiece to remove the atmospheric air; supply fresh shielding gas over portion 13 as this moves beneath beam 11; and maintain the gas shield for some time after welding, and after both the weld and workpiece have cooled.

For maintaining constant efficiency over the entire thickness of jet 21, this may consist of a number of elementary currents 22 varying in speed according to the height of current 22 in relation to the conduit face adjacent to the work surface. As the speed of the gas over the surface portion subjected to the laser beam must be directly proportional to the power of the beam, which, due to focusing, increases as the beam gets closer to portion 13, the speed of currents 22 preferably decreases upwards.

Figure 2:
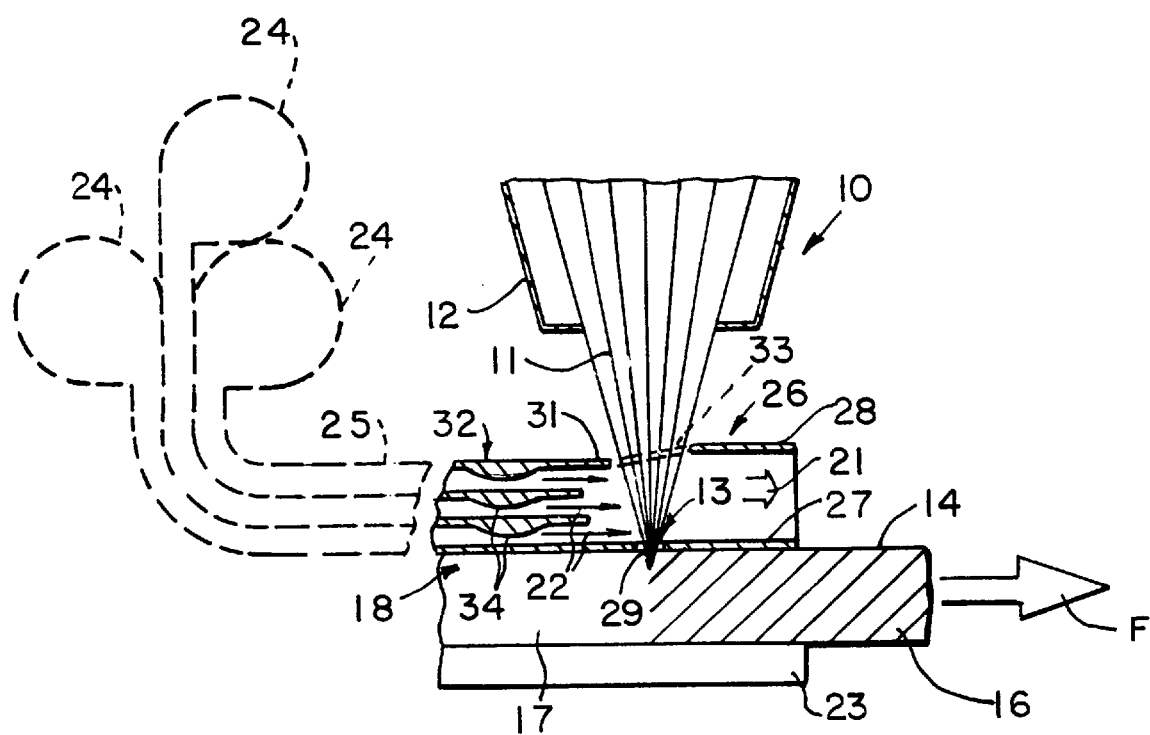
FIG. 2 shows a schematic section of a shielding gas supply device in accordance with a first embodiment of the present invention.

In the FIG. 2 embodiment, welding apparatus 10 comprises handling means, indicated schematically by 23, for moving workpieces 18 in relation to laser beam head 12; and the gas supply device comprises a gas tank 24, and a closed, solid-walled conduit 25 having a substantially rectangular-section portion 26 located over surface portion 13. To vary the heat content of elementary gas currents 22, both tank 24 and currents 22 may be separated by solid walls along the entire path of the gas, to produce a number of parallel gas circuits, in which both the stagnation parameters (pressure, temperature) and the characteristics of the gas itself (molecular weight, specific heat ratio, etc.) may be determined as required, and even differ from one circuit to another.

Portion 26 comprises a first wall 27 mating with, in this case, flat work surface 14; a wall 28 opposite wall 27; and slides over surface 14 of workpieces 18 as these are moved along by handling means 23. Portion 26 also presents an opening consisting of two holes 29, 31 in respective walls 27, 28, for the passage of beam 11 on to surface portion 13. The area (or, in the case of a circular beam, the diameter) of hole 31 is the smallest compatible with the passage of beam 11. As beam 11 is conical, for collimating it on to portion 13, the diameter of hole 29 is smaller than that of hole 31, but conveniently larger than the impact section of the beam, so as to accommodate the portion of the material of workpieces 18 liquefied by beam 11 and forming weld bead 19. The same also applies to beams of other, e.g. rectangular or square, sections.

Portion 26 presents a rectangular cross section, the width and height of which conveniently range respectively from 4 to 10 and 3 to 6 times the diameter of hole 29.

Upstream from holes 29 and 31, portion 26 presents gas accelerating means, e.g. nozzle means 32, for bringing jet 21 up to supersonic speed. To enable the gas, heated by the laser beam, to expand downstream from portion 13, hole 31 is located in a sloping portion 33 of wall 28, so that portion 26 presents a larger section downstream from holes 29, 31. This section must be further increased to accommodate the weld bead section downstream from hole 29, as well as any aerodynamic bodies inside the conduit.

The streamlined shape of portion 26 allows the gas flow to be substantially stationary. Flow parameters such as pressure and velocity remain substantially unchanged through the laser beam, and the optical properties of the gas are thus substantially uneffected.

According to a first embodiment, nozzle means 32 comprise a number of elementary nozzles 34 for producing respective elementary gas currents 22 at different levels in relation to portion 13, and designed to produce, in respective currents 22, speeds decreasing upwards according to the level of currents 22. The heat content and the nature of the gas in each current 22 may also differ, to enable other parameters, such as density, specific heat, absorption and ionization potential, to be so selected as to produce a gas having homogeneous optical properties, and which is totally unaffected, chemically and physically, by the variable-intensity laser beam, and throughout the welding process. In other words, the shielding gas, which plays no part in the actual process, acts as an aerodynamic window, which is totally transparent to the laser beam and inert in relation to the welding process. During welding, jet 21 flows over portion 13 of work surface 14 perpendicularly to laser beam 11, thus providing for effective, constant shielding of portion 13, while beam 11 is directed through hole 31, jet 21, and hole 29 on to portion 13 for welding surfaces 17 of workpieces 18. The supersonic speed of jet 21 provides for minimum contact between the shielding gas and beam 11, so as to substantially prevent any physical or chemical change in the gas, such as density, refraction coefficient and speed, thus also eliminating convective motion, excitation or ionization of the gas.

Figure 3:
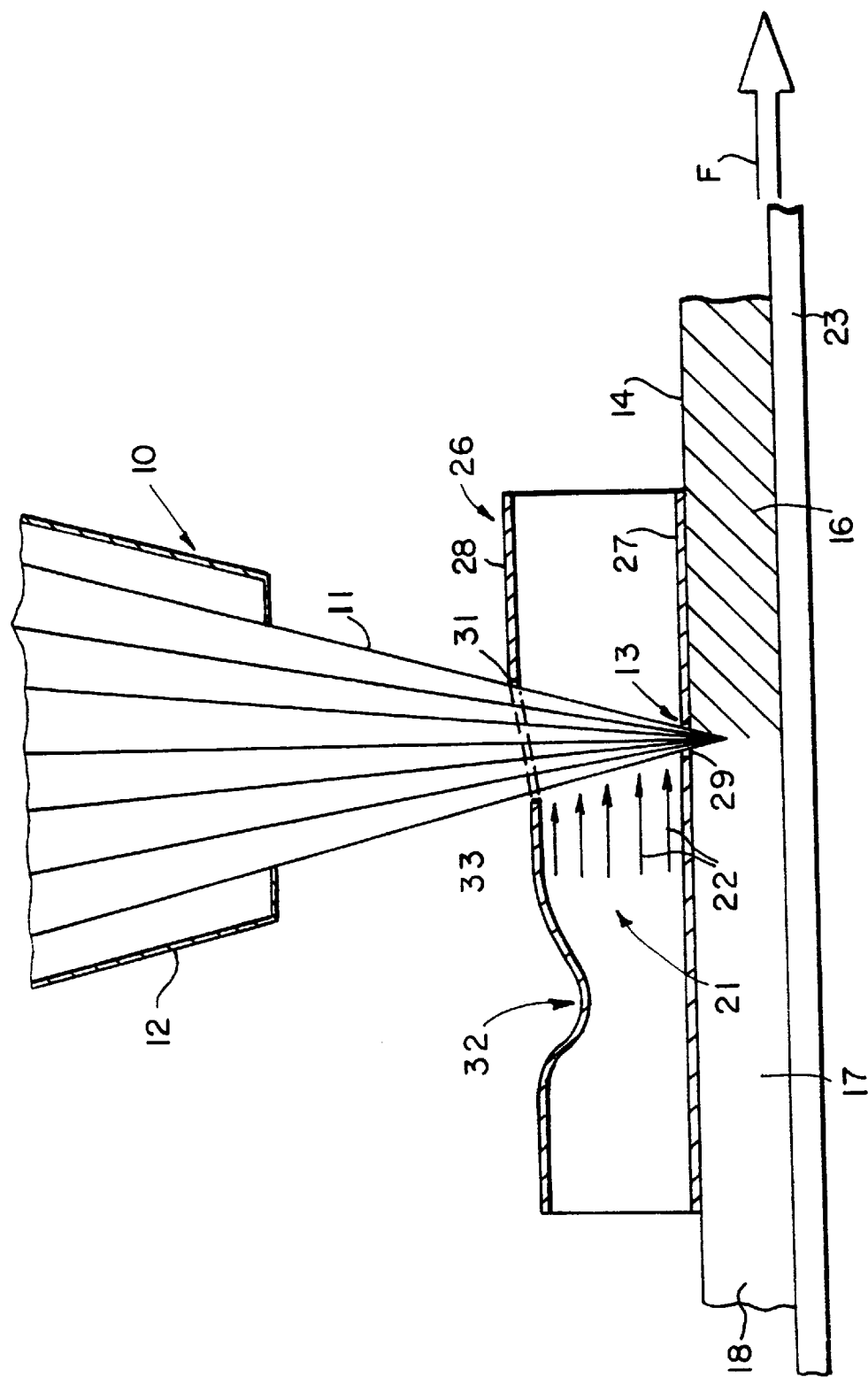
FIG. 3 shows a schematic section of a variation of the FIG. 2 device.

In the FIG. 3 variation, nozzle means 32 are formed by so shaping wall 28 of portion 26 as to produce, in known manner, a variable-speed gas jet 21 (multi-Mach nozzle). In particular, wall 28 may be so shaped as to produce a number of elementary gas currents 22 decreasing upwards in speed, at the beam crossover point, in relation to the distance between current 22 and wall 27 and, therefore, surface portion 13. In a further, simplified, solution, the nozzle may provide for one supersonic speed, providing this is sufficient for achieving the objectives described above, i.e. a jet capable of withstanding the maximum power of the beam without incurring drawbacks in the low-power regions. Such drawbacks may even be purely economical, such as a waste of gas, by supplying it at a higher speed than necessary over the low-power regions of the beam. The simplicity of the design and the wider margin of safety this provides for, however, may compensate for the increase in running cost.

Figure 4:
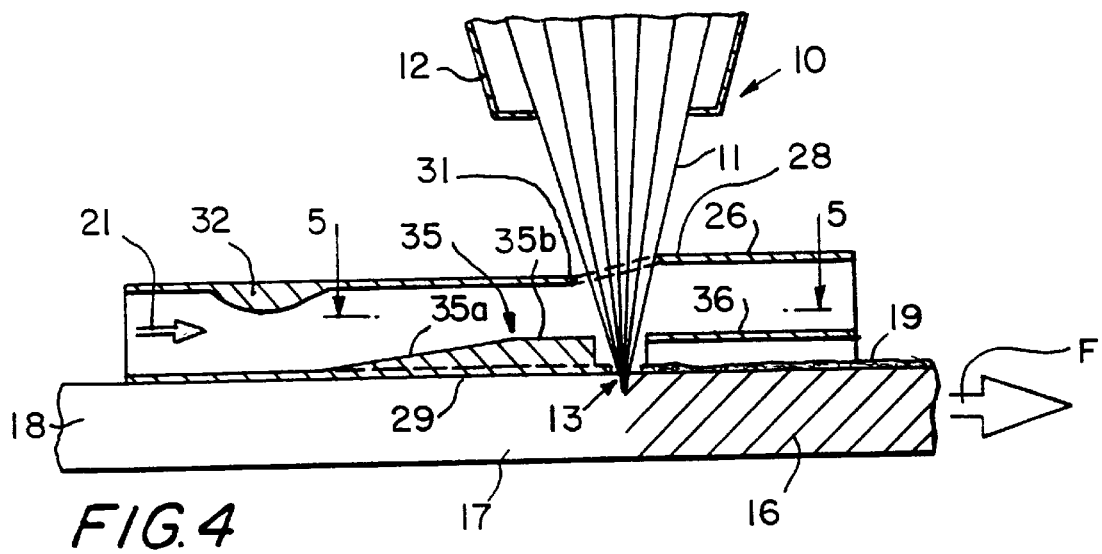
FIG. 4 shows a schematic section of a supply device in accordance with a further embodiment of the present invention.
Figure 5:
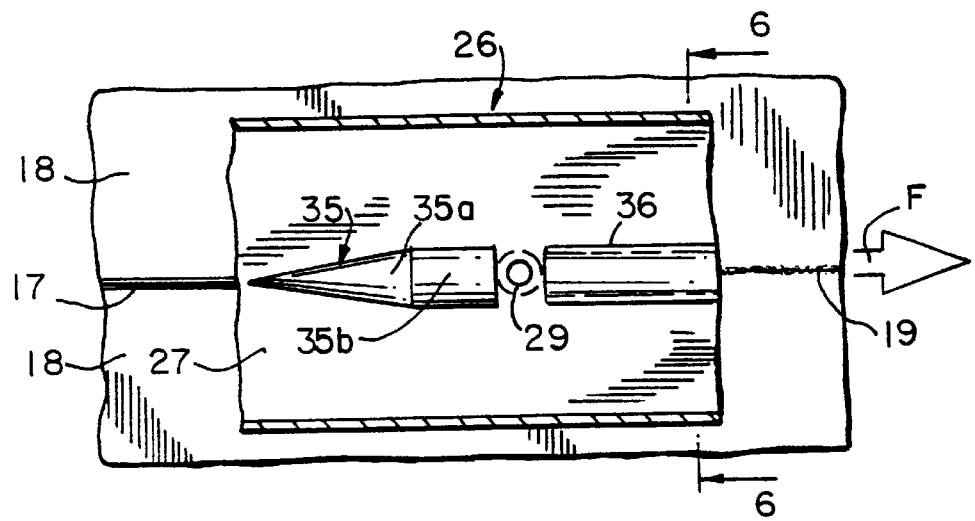
FIG. 5 shows a section along line V—V in FIG. 4.
Figure 6:
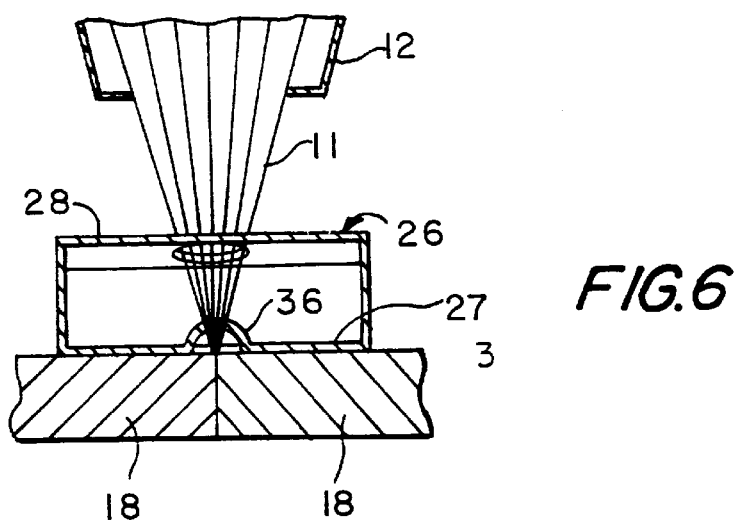
FIG. 6 shows a section along line VI—VI in FIG. 5.

In the FIG. 4, 5 and 6 embodiment, wall 27 defines, upstream from hole 29, a suitably streamlined body 35 having its longer axis aligned with the flow direction of the gas, for protecting the formation of the weld bead commencing at portion 13. As the formation of the molten metal from which weld bead 19 is formed is accompanied by thermo-fluid-dynamic pulsations, body 35 provides for:

a) protecting the molten metal from impact and, consequently, expulsion or erosion by the gas jet;

b) preventing the thermodynamic pulsations of the molten metal from involving a portion of the jet larger than the section of the body, thus providing for aerodynamic shielding.

Body 35 consists of a half cone 35a, the maximum end section of which continues into a half cylinder 35b of the same section, which is slightly larger than that of weld bead 19. The length of half cylinder 35b and half cone 35a is respectively 3-4 and 6-7 times the diameter of hole 29.

To protect the bead, during welding and until it has hardened, from erosion by the gas, a hollow half cylinder 36 of the same diameter as half cylinder 35b is located downstream from hole 29 and coaxially with body 35.

A sufficient, albeit weaker, stream of shielding gas penetrates half cylinder 36 for continued shielding of the bead as it hardens.

Figure 7:
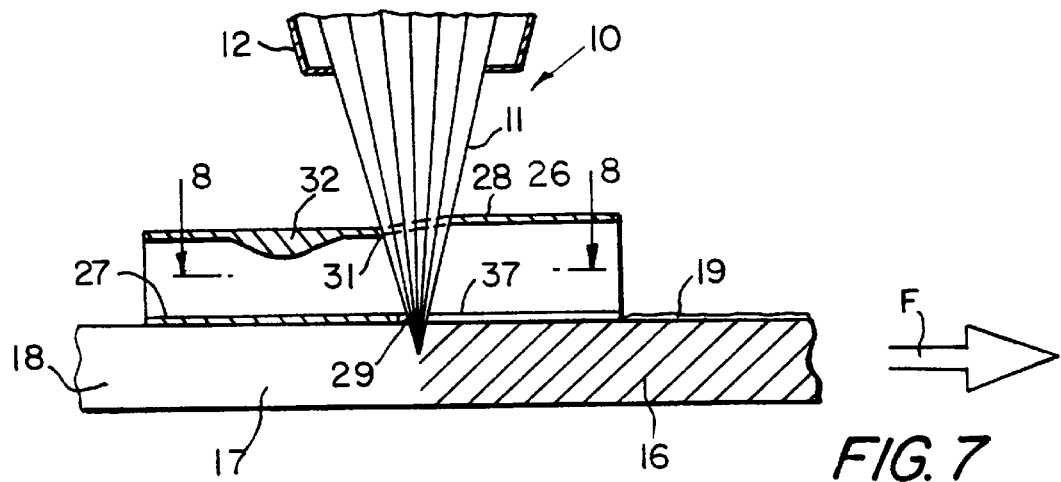
FIG. 7 shows a schematic section of a supply device in accordance with a further embodiment of the present invention.
Figure 8:
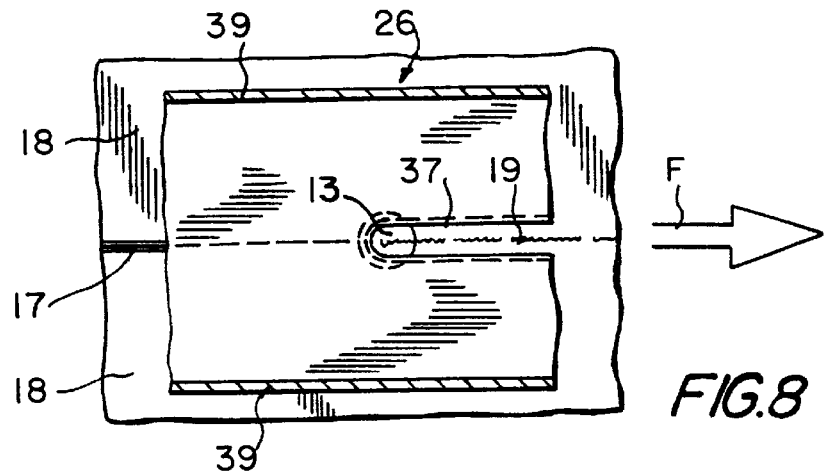
FIG. 8 shows a section along line VIII—VIII in FIG. 7.

In the FIG. 7 and 8 embodiment, formation of the weld bead is protected by the thickness of wall 27, which is comparable to the height of the bead, and wall 27 presents a slot 37 originating downstream from hole 29 and extending along the entire length of wall 27.

In cases where appearance takes precedence over structural/mechanical performance, a flat, smooth weld is preferred, both of which characteristics are obtainable by appropriately streamlining portion 26 of conduit 20, both up- and downstream from hole 29, and by varying the parameters of the gas jet.

Figure 9:
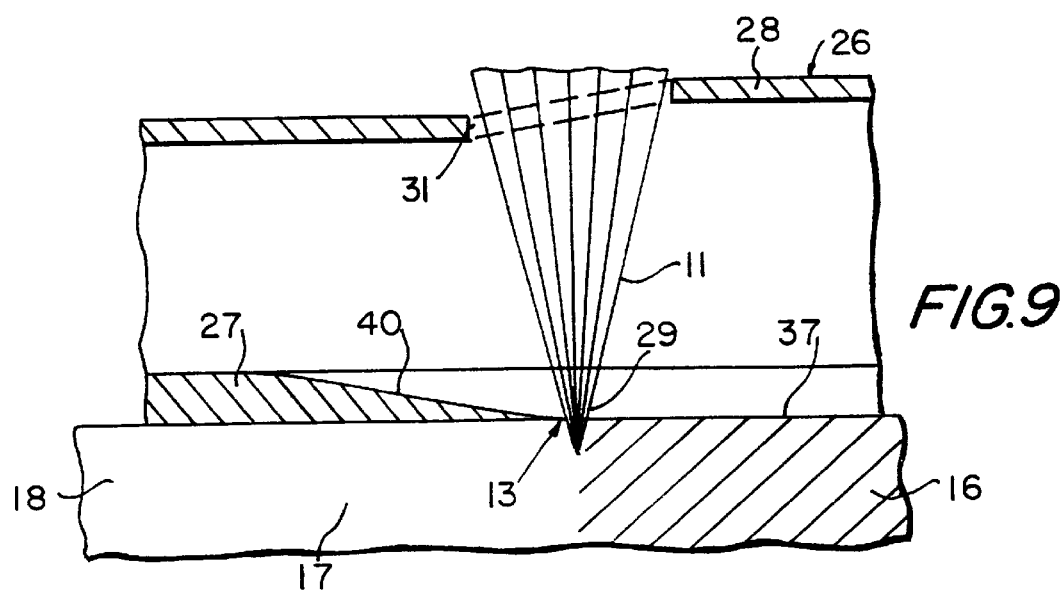
FIG. 9 shows a schematic section of a further variation of the FIG. 2 device.

In FIG. 9, for example, removal of bead 19 is achieved by appropriately streamlining wall 27 upstream from hole 29. In this case, wall 27 presents a groove 40 having its main axis in the gas flow direction, and so designed as to cause part of supersonic jet 21 to flow tangentially over the workpiece portion immediately upstream from hole 29. Downstream from hole 29, groove 40 continues in the form of slot 37 up to the end of wall 27.

Groove 40 thus causes the jet to flow over the work surface, commencing upstream and continuing downstream from hole 29. Both up- and downstream from hole 29, the thermo-fluid-dynamic properties of the supersonic jet are so exploited as to distribute the action of the gas on the molten material throughout the liquefaction and subsequent hardening stages.

The advantages of the method and device according to the present invention will be clear from the foregoing description. In particular, the solid wall of the conduit directing shielding gas jet 21 on to surface portion 13 subjected to laser beam 11 prevents the gas from mixing with atmospheric air. Also, the direction and high speed of jet 21 minimises the effect of beam 11 on the inert gas, by preventing chemical and physical changes, such as a variation in density and temperature, in turn affecting the refraction index of the gas, and resulting in convective motion seriously impairing the focus and, consequently, the power and efficiency of the laser beam.

Similarly, the present invention provides for totally eliminating excitation and ionization phenomena absorbing and seriously impairing the power of the beam. These effects, combined with the defocusing mentioned above, may, in extreme cases, so impair the power and efficiency of the beam as to result in blanketing, whereby most of the energy of the beam is prevented from reaching the workpiece, and is dissipated in the gases adjacent to the work surface.

The method and device according to the present invention also overcome the drawbacks currently posed by a larger portion of the impaired energy reaching the work surface, but in other forms, thus resulting in irregular weld beads; multiple stress states accompanied by an irregular metallurgical structure; inferior quality welds requiring greater energy; reduced output; and higher investment and running cost.

To those skilled in the art it will be clear that changes may be made to the embodiments described and illustrated herein without, however, departing from the scope of the present invention.

I claim:

1. A method of gas shielding laser processed workpiece(s) employing a laser beam, directed in a substantially perpendicular direction onto a surface portion of said workpiece(s) with the workpiece(s) and laser beam in relative motion in a direction along which a weld bead is formed, and a jet of shielding gas; wherein said jet of shielding gas is fed in the same direction as said workpiece(s) relative to the laser beam through a conduit defined by solid continuous and uninterrupted walls but for a laser beam inlet aperture having a minimum size to permit the passage of said laser beam therethrough and a laser beam outlet aperture aligned with said inlet aperture through a wall in said conduit with said wall mating with and sliding over said surface portion of said workpieces, said conduit having nozzle means extending crosswise in relation to said laser beam of a streamlined shape for causing said jet of shielding gas to become time steady and of uniform velocity as said laser beam crosses said jet of shielding gas and wherein said jet of shielding gas is supplied at a high velocity sufficient to eliminate existing ambient gas in said conduit to substantially minimize the physical, dynamic and chemical effects of said laser beam in said gas.

2. A method as in claim 1, wherein the velocity of said gas adjacent said laser beam is substantially the same on opposite sides thereof within said conduit for minimizing said effects of such beam on said gas.

3. A method as in claim 1, wherein said gas jet is supplied at supersonic speed.

4. A method as in claim 3, wherein said gas jet is supplied in the form of a plurality of parallel, elementary currents, the speed of which decreases with an increase in the distances of said current from to said surface.

5. A method as in claim 4, wherein said elementary currents are supplied by complete, independent, parallel circuits; each circuit having a respective tank, and being designed to supply a gas or gas mixture having different physical properties and different enthalpic and stagnation conditions.

6. A method as in claim 1, wherein said process consists in the welding of two metal workpieces, and said jet of shielding gas is supplied in the same direction as that in which said workpieces travel in relation to said laser beam.

7. In an apparatus for laser processing a workpiece, whereby a laser beam is directed in a substantially perpendicular direction on to a surface portion of said workpiece with the workpiece and laser beam in relative motion in a direction along which a weld bead is formed in said workpiece, a device for gas shielding said workpiece comprising means for storing a shielding gas and means for supplying said gas from said storage means onto said surface portion, said supply means comprising at least one conduit arranged to feed said shielding gas in the same direction as said workpiece relative to said laser beam wherein said conduit is a hollow body with solid uninterrupted walls extending crosswise in relation to said laser beam but for a laser beam inlet aperture having a minimum size to permit the entrance passage of said laser beam through said aperture and a laser beam outlet aperture aligned with said inlet aperture through a wall in said conduit with said wall mating with and sliding over said surface portion of said workpiece, said conduit having nozzle means of a streamlined shape for causing said jet of shielding gas to become time steady and of uniform velocity and wherein said jet of shielding gas is of a high velocity sufficient to eliminate existing ambient gas in said conduit and to substantially minimize the physical, dynamic and chemical effects of said laser beam in said gas.

8. A device as in claim 7, wherein said conduit presents a bottom wall having a surface resting on said surface of said workpiece and a top wall opposite said bottom wall, said laser beam outlet aperture being formed in said bottom wall, said laser beam inlet aperture being formed in said top wall.

9. A device as in claim 8, wherein upstream from said outlet aperture, said bottom wall presents an inner groove for directing said shielding gas on to said surface portion.

10. A device as in claim 7, wherein said outlet aperture has an area such as to accommodate the weldment formed by said workpiece subjected to said laser beam.

11. A device as in claim 7, wherein said work surface is substantially flat; and said conduit presents a substantially rectangular section.

12. A device as in claim 11, wherein said rectangular cross section has a width which ranges from 4 to 10 times the size of said outlet aperture, and a height which ranges from 3 to 6 times the diameter of the outlet aperture.

13. A device as in claim 7, wherein said nozzle means produces a supersonic gas jet.

14. A device as claimed in claim 13, wherein said nozzle means produces a gas jet consisting of a plurality of elementary gas currents decreasing in speed with an increase in cross sectional area in relation to said surface portion.

15. A device as in claim 7, wherein said conduit presents a larger cross section downstream than immediately upstream from said apertures.

16. A device as in claim 7, wherein said apparatus provides for welding two metal workpieces along respective mating flat surfaces, and comprises means for moving said workpieces in relation to said apparatus and that said conduit is so arranged as to supply said gas jet on to said surface portion in the same direction as said means supporting said workpieces.

17. A device as claimed in claim 16, wherein said conduit presents means for directing at least part of said jet from said surface portion along a bead of said weld.

18. A device as claimed in claim 17, wherein said directing means comprises a slot parallel to the flow through said conduit; said slot being formed in said bottom wall and extending downstream from said output aperture along the entire length of said bottom wall.

19. A device as in claim 18, wherein upstream from said outlet aperture, said bottom wall presents a streamlined body having its longer axis in the direction of said gas jet, and consisting of a half cone portion continuing into a semicylindrical portion.

20. A device as in claim 19, wherein it comprises a hollow half cylinder having its longer axis in the flow direction of said gas; said half cylinder forming part of said bottom wall and extending downstream from said outlet aperture.

* * * * *